United States Patent
Arwine et al.

(10) Patent No.: US 6,454,365 B1
(45) Date of Patent: Sep. 24, 2002

(54) BRAKE CONTROL SYSTEM FOR ACTIVELY CONTROLLING WHEEL BRAKES

(75) Inventors: Joan B. Arwine, Spingboro; Jon T. Zumberge, Dayton, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/754,420

(22) Filed: Jan. 3, 2001

(51) Int. Cl.[7] ................................................. B60T 8/60
(52) U.S. Cl. .................. 303/155; 303/113.4; 303/616.4
(58) Field of Search ................................. 303/155, 153, 303/178, DIG. 3, DIG. 4, 113.4

(56) References Cited

U.S. PATENT DOCUMENTS 5,163,742 A * 11/1992 Topfer et al. ................ 303/153

* cited by examiner

Primary Examiner—Matthew C. Graham
(74) Attorney, Agent, or Firm—Scott A. McBain

(57) ABSTRACT

Systems and methods are disclosed to control a braking system. One method provides a command signal to a valve to control fluid pressure to a wheel brake in a braking system, includes determining a pressure signal based on a first set for control gains and a pressure command signal, determining a first current signal based upon the pressure command signal, subtracting an actual pressure signal from the pressure command signal to produce an error signal, and determining a second current signal based on the second set of control gains and the error signal. The method further includes subtracting a supply pressure actual signal from a supply pressure nominal signal to produce a pressure differential signal, multiplying the pressure differential signal by a selected gain to produce a third current signal, and summing the first current signal, the second current signal and the third current signal to produce an output signal.

19 Claims, 2 Drawing Sheets

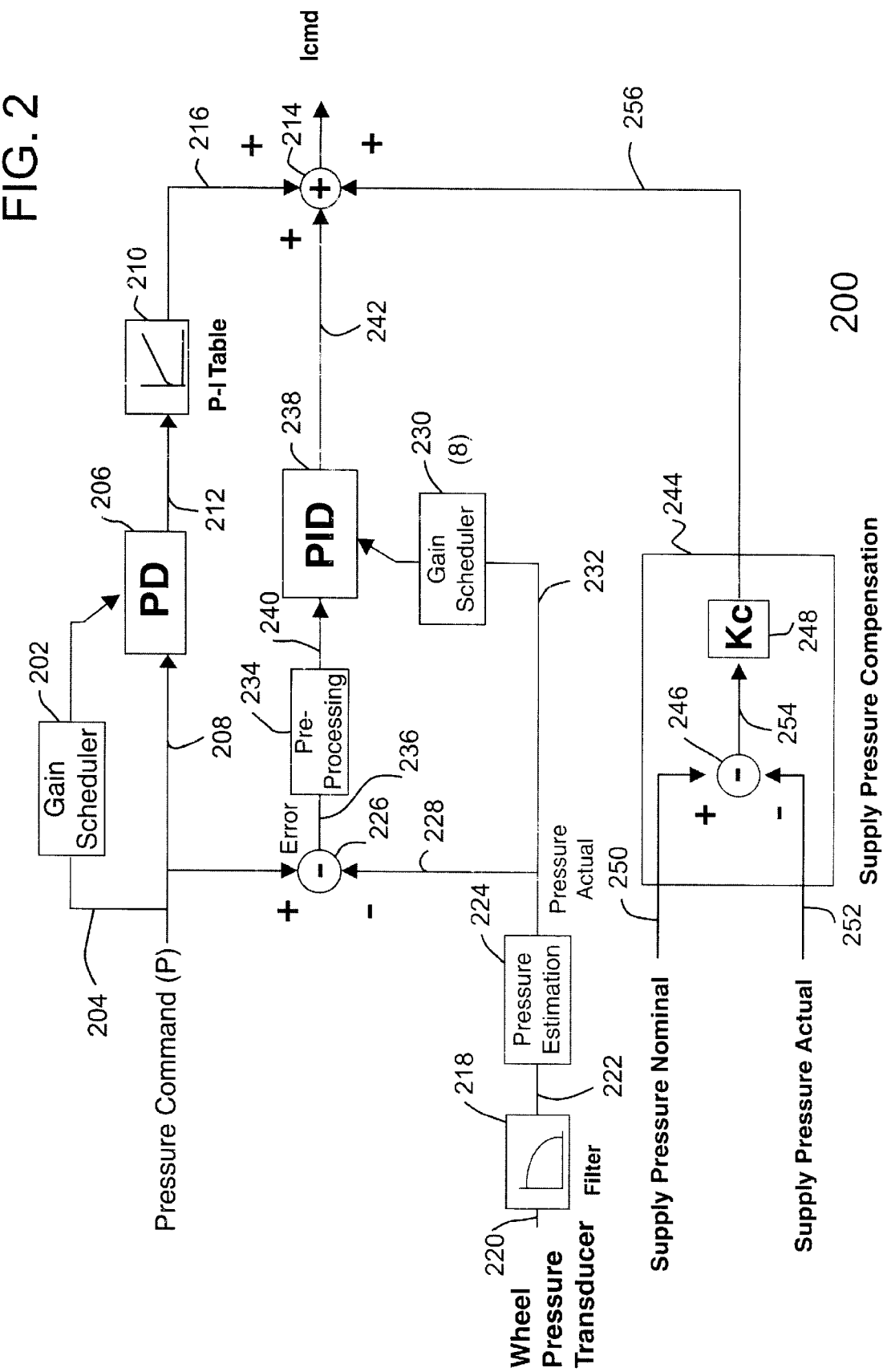

BRAKE CONTROL SYSTEM FOR ACTIVELY CONTROLLING WHEEL BRAKES

TECHNICAL FIELD

The present invention generally relates to vehicle braking systems and, more particularly to automobile vehicle controls.

BACKGROUND OF THE INVENTION

In conventional automotive braking systems, a master cylinder converts a manual application of a force exerted on a brake pedal into a corresponding hydraulic pressure, which is proportioned among the front and rear wheel brakes. In power assisted braking systems, a vacuum booster is interposed between the brake pedal and the master cylinder to increase the amount of fluid pressure transferred through the braking system under the operations of vacuum assistance or hydraulic power.

As an alternative to these conventional automotive braking systems, electro-hydraulic braking systems have been developed to amplify fluid brake pressures using electrically powered boost units. In these systems, the master cylinder pressure is usually coupled through normally open solenoid valves and electrically powered boost units to the wheel brakes. In normal braking, the solenoid valves are activated to isolate the master cylinder from the wheel brakes, and the electrically powered boost units are activated to develop fluid brake pressures based on various braking parameters. In the event of an electrical failure, the solenoid valves may return to their normally open state, re-coupling the master cylinder to the wheel brakes, allowing continued braking with the manually developed master cylinder pressure.

However, the powered boost units of the electro-hydraulic braking systems usually consume considerable power during extended idling when a high level of braking force is not typically required. This condition can occur, for example, when the driver is exerting significant brake pedal force while waiting for a traffic light. In addition to the unnecessary power consumption, this condition typically causes unnecessary heat generation in the powered boost units and controller, possibly adversely affect their durability.

SUMMARY

The present invention provides a brake control system for actively controlling the wheel brakes of a motor vehicle. The brake control system includes a closed-loop control system that controls the amount of fluid pressure provided to the wheel brakes. The brake control system provides enhanced brake performance through faster system responses and improved controllability than conventional vacuum-boosted brake systems. The brake control system further decreases power consumption under the certain conditions and improves the durability of the brake system.

One method in accordance with the present invention for providing a command signal to a valve to control fluid pressure to a wheel brake in a braking system includes the steps of determining a pressure signal using a first control technique based on a first set for control gains and a pressure command signal, determining a first current signal based upon the pressure signal, subtracting an actual pressure signal from the pressure command signal to produce an error signal, and determining a second current signal using a second control technique based on the second set of control gains and the error signal. The method further includes subtracting a supply pressure actual signal from a supply pressure nominal signal to produce a pressure differential signal, multiplying the pressure differential signal by a selected gain to produce a third current signal, and summing the first current signal, the second current signal and the third current signal to produce an output signal.

One braking system in accordance with the present invention includes a master cylinder for delivering pressurized fluid in response to a mechanical input. A first sensor provides a supply pressure signal in response to fluid pressure delivered by the accumulator. A second sensor provides a wheel pressure signal in response to fluid pressure applied to at least one wheel brake. A controller is responsive to the wheel pressure signal and supply pressure signal to produce a pressure command signal. The controller implements the steps of determining a first current signal using a first control technique based on a first set for control gains and the pressure command signal, determining an actual pressure signal based upon the wheel pressure signal. subtracting an actual pressure signal from the pressure command signal to produce an error signal, and determining a second current signal using a second control technique based on a second set of control gains and the error signal. The controller also implements the steps of subtracting the supply pressure signal from a supply pressure nominal signal to produce a pressure differential signal, multiplying the pressure differential signal by a selected gain to produce a third current signal, and summing the first current signal, the second current signal and the third current signal to produce an output signal.

The invention, together with attendant advantages, will best be understood by reference to the following detailed description of the preferred embodiments of the invention, taken in conjunction with the accompanying drawings.

BRIEF DESCRIPTION OF THE DRAWINGS

FIG. 2 is a flow diagram implemented by the controller of FIG. 1 in accordance with the present invention.

DETAILED DESCRIPTION OF THE PRESENTLY PREFERRED EMBODIMENTS

Figure 1:
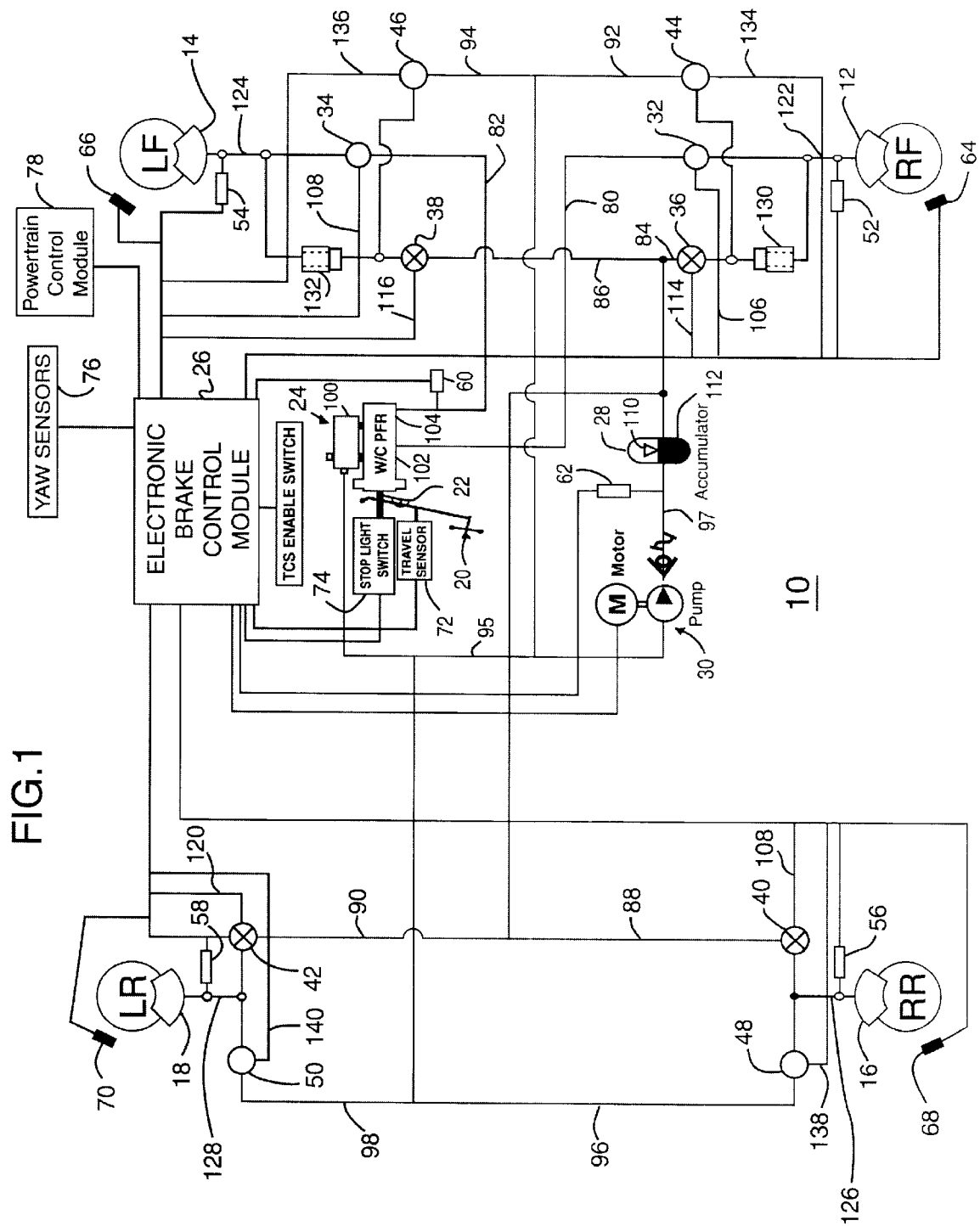
FIG. 1 is a schematic diagram of a braking system.

Referring now to the drawings, and particularly to FIG. 1, one embodiment of an exemplary braking system 10 is shown for controlling of the amount of fluid pressure provided to the wheel brakes 12, 14, 16, and 18. The braking system 10 provides enhanced brake performance through faster system responses and improved controllability of braking operations. The braking system 10 is capable of manual base brake operation and is capable of electrically controlled brake operations in response to manual actuation or various sensed vehicle operational parameters for traditional braking, anti-lock braking, traction control operation, and other braking operations.

The braking system 10 generally includes a brake pedal 20, a push-rod 22, a master cylinder 24, an electronic controller 26, an accumulator 28, a motor driven pump assembly 30, isolation valves 32 and 34, apply valves 36, 38, 40 and 42, release valves 44, 46, 48, and 50, pressure sensors 52, 54, 56, 58, 60 and 62, wheel speed sensors 64, 66, 68 and 70, a brake pedal travel sensor 72, a stop light switch 74, yaw sensors 76, a power train control module 78, and hydraulic or supply lines 80, 82, 84, 86, 88, 90, 92, 94, 95, 96, 97 and 98. Although a four channel braking system is illustrated as an exemplary embodiment, the braking system can include any other suitable type of braking system.

The master cylinder 24 of the braking system 10 is manually actuated in response to the application of a force to the brake pedal 20 through the push rod 22. The brake pedal travel sensor 72 and the pressure sensor 60 senses the degree of braking effort commanded by the vehicle operator. The stop light switch 74 provides an output signal to turn on rear brake lights when the brake pedal 20 has been depressed. The brake pedal 20 may be a conventional brake pedal and the stop light switch 74 may be a conventional brake pedal switch.

The master cylinder 24 can be a conventional dual piston type or any other suitable master cylinder. The master cylinder 24 includes a fluid reservoir 100 and two output ports 102 and 104. The master cylinder 24 transmits pressurized fluid through the output ports 102 and 104 to actuate the wheel brakes 12 and 14 through the supply lines 80 and 82. The supply lines 80 and 82 extend through isolation valves 32 and 34 to the wheel brakes 12 and 14.

The isolation valves 32 and 34 are preferably solenoid fluid valves selectively operated by the electronic controller 26 via lines 106 and 108. The isolation valves 32 and 34 are preferably in a normal open position so that the supply lines 80 and 82 are in fluid communication with the wheel brakes 12 and 14. In a normal base brake mode, the manual actuation of the master cylinder 24 through the application of a force to the brake pedal 20 provides pressurized fluid through the normally open isolation valves 32 and 34 to the wheel brakes 12 and 14. When a command is received from the electronic controller 26, the isolation values 32 and 34 can be closed in a normal braking operation to isolate the pressurized fluid in the supply lines 80 and 82 from the respective wheel brakes 12 and 14 and accumulator 28.

The motor driven pump assembly 30 generates the fluid pressure requirements for the braking system 10. The motor driven pump assembly 30 is connected to the reservoir 100 of the master cylinder 24 through the supply line 95 and to the accumulator 28 through the supply line 97. In one embodiment, the motor driven pump assembly 30 is used to pump fluid to the accumulator 28.

The accumulator 28 of the braking system 10 cooperates with the motor driven pump assembly 30 to maintain and supply fluid pressure for the braking requirements of the wheel brakes 12, 14, 16 and 18. The accumulator 28 permits absorption of fluid pressure from the wheel brakes via the release valves 44, 46, 48 and 50 and the reservoir/motor driven pump assembly 30. The accumulator 28 also distributes fluid pressure via supply lines 84, 86, 88 and 90 to the apply valves 36, 38, 40 and 42. The accumulator 28 preferably includes a gas chamber 110 and a fluid chamber 112. The pressure sensor 62 monitors the fluid pressure in the supply line 97 in order to establish a desired level of pressure charge in the fluid chamber 112 of accumulator 28. The accumulator 28 can be suitable accumulator.

The apply valves 36, 38, 40 and 42 of the braking system 10 preferably include solenoid fluid valves or proportional poppet valves. The apply valves 36, 38, 40 and 42 are selectively operated by the electronic controller 26 via lines 114, 116, 118, 120 to selectively proportion the fluid pressure to each of the wheel brakes 12, 14, 16 and 18. The apply valves 36, 38, 40 and 42 are in fluid communication with the accumulator 28 through supply lines 84, 86, 88 and 90 and with the wheel brakes 12, 14, 16 and 18 through supply lines 122, 124, 126, and 128. The apply valves are preferably closed in manual base braking to isolate the pressurized fluid in the supply lines 84, 86, 88 and 90 from the each of wheel brakes. When a command is received from the electronic controller 26, the apply valves can be opened to selectively provide the pressurized fluid in the supply lines 122, 124, 126 and 128 to the respective wheel brakes. Isolation pistons 130 and 132 are disposed between the apply valves 36 and 38 and the wheel brakes 12 and 14.

The release valves 44, 46, 48 and 50 preferably include solenoid fluid valves or proportional poppet valves. The release valves 44, 46, 48 and 50 are selectively operated by the electronic controller 26 via lines 134, 136, 138 and 140 to allow excess pressure provided to the wheel brakes to flow to the reservoir/motor driven pump assembly 30. The release valves 44, 46, 48 and 50 are in fluid communication with the motor driven pump assembly 30 through supply lines 92, 94, 96 and 98 and with the wheel brakes 12, 14, 16 and 18 through supply lines 122, 124, 126 and 128. The release valves are normally in an open position to prevent undesired pressure build-up at the wheel brakes 12, 14. When a command is received from the electronic controller 26, the release valves can be closed or energized to allow pressurized fluid to flow from the supply lines 122, 124, 126 and 128 to the wheel brakes 12,14,16,18, thereby increasing pressurized fluid to the respective wheel brakes.

The electronic controller 26 manages the operation of the braking system 10 and establishes desired braking conditions at each of the wheel brakes 12, 14, 16 and 18. In carrying out the control of the braking system 10, the electronic controller 26 receives pressure signals from the pressure sensors 52, 52, 54, 56, 58, 60 and 62, wheel speed signals from wheel speed sensors 64, 66, 68 and 70, a signal from brake pedal travel sensor 72, a signal from the stop light switch 74, yaw rate signals from yaw rate sensors 76, and a signal from the power train control module 78. The pressure sensor, wheel speed sensors, brake pedal travel sensors, and the yaw rate sensors may be any suitable type of transducers and the stop light switch may be any suitable type of switch. In response to signals received by the electronic controller 26, the electronic controller 26 provides command signals to the motor driven pump assembly 30, apply valves 36, 38, 40 and 42, release valves 44, 46, 48 and 50, and isolation valves 32 and 34 to control the braking of each wheel during braking operations. The electronic controller 26 may be any microprocessor-based controller or any other suitable controller.

During a failed mode, the system reverts to manual base brake operation of the braking system 10, wherein the manual application of a force on the brake pedal 20 results in actuation of the master cylinder 24. The master cylinder 24 pressurizes the supply lines 80 and 82 through the output ports 102 and 104. The fluid pressure in the supply lines 80 and 82 is transmitted through the isolation valves 32 and 34 directly to the wheel brakes 12 and 14. When the driver's foot is released from the brake pedal, fluid is forced through the brake lines and back to the master cylinder 24.

Referring now to FIG. 2, one embodiment of an algorithm 200 implemented by the braking system 10 of FIG. 1 is shown. The algorithm is utilized to control the amount of fluid pressure provided to a wheel brake. The algorithm 200 is preferably implemented by the electronic controller to control the command signals provided to each of the apply and release valves. Those skilled in the art will understand that the algorithm shown can provide command signals for each individual channel or wheel brake selected for control by the electronic controller.

Gain scheduler block 202 receives a pressure command signal (P) on line 204 determined by the electronic controller 26 in response to various parameters of the braking system. The gain scheduler block 202 determines the control gains based upon the value of the pressure command signal. The gain scheduler block 202 determines proportional and derivative control gains Kp and Kd from a plurality of sets of control gains in a look-up table. The control gains can be easily determined by one skilled in the art in accordance with standard PD control techniques and equations which will vary from implementation to implementation based on, the type of apply and release valves used and the desired brake system performance characteristics.

Proportional-derivative (PD) controller block 206 receives the control gains Kp and Kd from the gain scheduler block 202 and receives the pressure command signal on line 208. The PD controller block 206 implements proportional and derivative control in accordance with the flowing equation: $u=K_p*P+K_d*dP/dt$, where P is the pressure command signal, Kp represents proportional control gain, and Kd represents derivative control gain. The PD controller block 206 generates an output pressure signal that is provided to a pressure signal to current conversion (P-I) table or block 210 on line 212. The P-I block 210 calculates a first current signal based upon the output pressure signal. The first current signal is sent to the summation block 214 on line 216.

Filter block 218 receives a wheel pressure signal generated from a wheel pressure sensor on line 220. The filter block 218 preferably implements a low-pas filter operation on the wheel pressure signal to provide a filtered low frequency component signal on line 222 that is provided to a pressure estimation block 224. The pressure estimation block 224 estimates the actual pressure at the wheel brakes based upon the measured pressure at the modulator. The pressure estimation block 224 generates a pressure actual signal. The pressure actual signal is provided to a summation block 226 on line 228 and a gain scheduler block 230 on line 232.

The summation block 226 subtracts the actual pressure signal from the pressure command signal to produce a pressure error signal. The pressure error signal is inputted into a pre-processing block 234 on line 236. The pre-processing block 234 processes the pressure error signal to generate a pre-processed signal that is sent to the PID controller block 238 on line 240.

The gain scheduler block 230 receives the actual pressure signal on line 232 from the pressure estimation block 224. The gain scheduler block 230 determines the control gains based upon the value of the actual pressure signal. The gain scheduler block 230 determines proportional, integral and derivative control gains Kp, Ki, and Kd from a plurality of sets of control gains in a look-up table. Generally, for low pressures, a large gain is required, and for high pressures, low gains are required. The PID control gains can be easily determined by one skilled in the art in accordance with standard PID control techniques and equations and will vary from implementation to implementation based on, the type of apply and release valves used and the desired brake system performance characteristics.

The PID controller block 238 receives the control gains Kp, Ki, and Kd from the gain scheduler block 230 and receives the pre-processed error signal (e) from the pre-processing block 234 on line 240. The PID controller block 238 computes a second current signal by multiplying the proportional control gain (Kp) by the magnitude of the pre-processed error signal plus the derivative control gain (Kd) times the derivative of the pre-processed error signal plus the integral control gain (Ki) times the integral of the pre-processed error in accordance with the following equation: $u=K_p*e+K_d*de/dt+K_i*\int (e)\, dt$. The second current signal produced by the PID controller block 238 is sent to the summation block 214 on line 242. Supply pressure compensation block 244 includes a summation block 246 and a multiplication block 248. The summation block 246 subtracts a supply pressure actual signal measured by the accumulator pressure sensor on line 250 from a supply pressure nominal signal on line 252 to produce an output signal on line 254. The output signal is multiplied by a scaling factor or gain Kc term at the multiplication block 248 to produce a third current signal. The third current signal is sent to the summation block 214 on line 256. The summation block 214 sums the first current signal, the second current signal, and the third current signal to produce a final current signal to control one of the apply and release valves of the braking system. It will be recognized that the algorithm described above can be used to calculate voltage command signals to control the apply and release valves of the braking system.

Although the present invention has been described in detail by way of illustration and example, it should be understood that a wide range of changes and modifications can be made to the preferred embodiments described above without departing in any way from the scope and spirit of the invention. Thus, the described embodiments are to be considered in all respects only as illustrative and not restrictive, and the scope of the invention is, therefore, indicated by the appended claims rather than the foregoing description. All changes that come within the meaning and range of equivalency of the claims are to be embraced within their scope.

We claim:

1. A method for providing a command signal to a valve to control fluid pressure to a wheel brake in a braking system, said method comprising the steps of:

determining a pressure signal based on a first set of control gains and a pressure command signal;

determining a first current signal based upon the pressure signal;

subtracting an actual pressure signal from the pressure command signal to produce an error signal;

determining a second current signal based on a second set of control gains and the error signal;

subtracting a supply pressure actual signal from a supply pressure nominal signal to produce a pressure differential signal;

multiplying the pressure differential signal by a selected gain to produce a third current signal; and summing the first current signal, the second current signal and the third current signal to produce an output signal.

2. The method of claim 1, further comprising the step of determining the first set of control gains based upon a pressure command signal.

3. The method of claim 1, wherein in the first set of control gains include one of a proportion gain and a derivative gain.

4. The method of claim 1, wherein the step of determining the first current signal is determined using a pressure-current conversion table.

5. The method of claim 1, further comprising the step of filtering a wheel pressure signal to produce the filtered pressure signal.

6. The method of claim 1, wherein the actual pressure signal is determined using a pressure estimation operation.

7. The method of claim 1, wherein the error signal is pre-processed.

8. The method of claim 1, further comprising the step of determining the second set of control gains based upon the actual pressure signal.

9. The method of claim 1, wherein in the second set of control gains include one of a proportion control gain, an integral control gain and a derivative control gain.

10. The method of claim 1, wherein the valve includes one of an apply solenoid valve and a release solenoid valve.

11. The method of claim 1, wherein the brake system comprises an electro-hydraulic braking system.

12. A braking system, comprising:
  a master cylinder for delivering pressurized fluid in response to a mechanical input;
  a first sensor for providing a pressure signal in response to fluid pressure delivered by an accumulator;
  a second sensor for providing a wheel pressure signal in response to fluid pressure applied to at least one wheel brake; and
  a controller responsive to the wheel pressure signal and supply pressure signal to produce a pressure command signal, the controller operable to
  determine a first current signal based on a first set of control gains and the pressure command signal;
  determine an actual pressure signal based upon the wheel pressure signal;
  subtract an actual pressure signal from the pressure command signal to produce an error signal;
  determine a second current signal based on a second set of control gains and the error signal;
  subtract the supply pressure signal from a supply pressure nominal signal to produce a pressure differential signal;
  multiply the pressure differential signal by a selected gain to produce a third current signal; and
  sum the first current signal, the second current signal and the third current signal to produce an output signal.

13. The braking system of claim 12, further comprising an accumulator for acceptance of pressurized fluid from the master cylinder.

14. The braking system of claim 12, a motor for delivering pressurized fluid to the accumulator in response to a command signal.

15. The braking system of claim 12, further comprising the step of determining the first set of control gains based upon a pressure command signal.

16. The braking system of claim 12, wherein the step of determining the first current signal is determined using a pressure-current conversion table.

17. The braking system of claim 12, wherein the actual pressure signal is determined using pressure estimation and a filtered operation.

18. The braking system of claim 12, further comprising the step of determining the second set of control gains based upon the actual pressure signal.

19. A braking system, comprising:
  means for determining a pressure signal based on a first set of control gains and a pressure command signal;
  means for determining a first current signal based upon the pressure command signal;
  means for subtracting an actual pressure signal from the pressure command signal to produce an error signal;
  means for determining a second current signal based on a second set of control gains and the error signal;
  means for subtracting a supply pressure actual signal from a supply pressure nominal signal to produce a pressure differential signal;
  means for multiplying the pressure differential signal by a selected gain to produce a third current signal; and
  means for summing the first current signal, the second current signal and the third current signal to produce an output signal.

* * * * *